US008248473B2

(12) United States Patent  
Graber

(10) Patent No.: US 8,248,473 B2
(45) Date of Patent: Aug. 21, 2012

(54) ROBOTIC SENTRY WITH LOW DISPERSION ACOUSTIC PROJECTOR

(76) Inventor: Curtis E. Graber, Woodburn, IN (US)

( * ) Notice: Subject to any disclaimer, the term of this patent is extended or adjusted under 35 U.S.C. 154(b) by 1470 days.

(21) Appl. No.: 11/543,507

(22) Filed: Oct. 5, 2006

(65) Prior Publication Data

US 2008/0084787 A1     Apr. 10, 2008

(51) Int. Cl.
*H04N 7/18* (2006.01)
(52) U.S. Cl. ........ 348/153; 348/152; 348/155; 348/159; 340/541; 382/115
(58) Field of Classification Search ............ 348/152, 348/153, 155, 159; 340/541; 382/115
See application file for complete search history.

(56) References Cited

U.S. PATENT DOCUMENTS

| | | | |
|---|---|---|---|
| 4,679,034 A * | 7/1987 | Kamada | 340/567 |
| 5,877,998 A | 3/1999 | Aidala et al. | |
| 6,175,382 B1 | 1/2001 | Mohr | |
| 6,204,762 B1 * | 3/2001 | Dering et al. | 340/541 |
| 6,532,191 B2 | 3/2003 | LaRosa et al. | |
| 6,538,689 B1 * | 3/2003 | Chang | 348/159 |
| 6,947,590 B2 | 9/2005 | Magarey et al. | |
| 7,023,913 B1 | 4/2006 | Monroe | |
| 7,084,761 B2 * | 8/2006 | Izumi et al. | 340/541 |
| 7,327,253 B2 * | 2/2008 | Whitten et al. | 340/541 |
| 2001/0043270 A1 * | 11/2001 | Lourie et al. | 348/155 |
| 2002/0070859 A1 | 6/2002 | Gutta et al. | |
| 2004/0161133 A1 * | 8/2004 | Elazar et al. | 382/115 |
| 2005/0110634 A1 | 5/2005 | Salcedo et al. | |

* cited by examiner

*Primary Examiner* — Sath V Perungavoor
*Assistant Examiner* — James Pontius
(74) *Attorney, Agent, or Firm* — Paul W. O'Malley; Susan L. Firestone

(57) ABSTRACT

A system of remotely locatable sentries or watchtowers operate as part of a network of such sentries or towers for securing a border or perimeter over a wide area. A sensor array, including particularly an array of video cameras, provides for detection, tracking and identification of a target. The sentry or watch towers include non-lethal, sound-based instrumentalities for discouraging entry into and passage through a secured zone of the target.

10 Claims, 15 Drawing Sheets

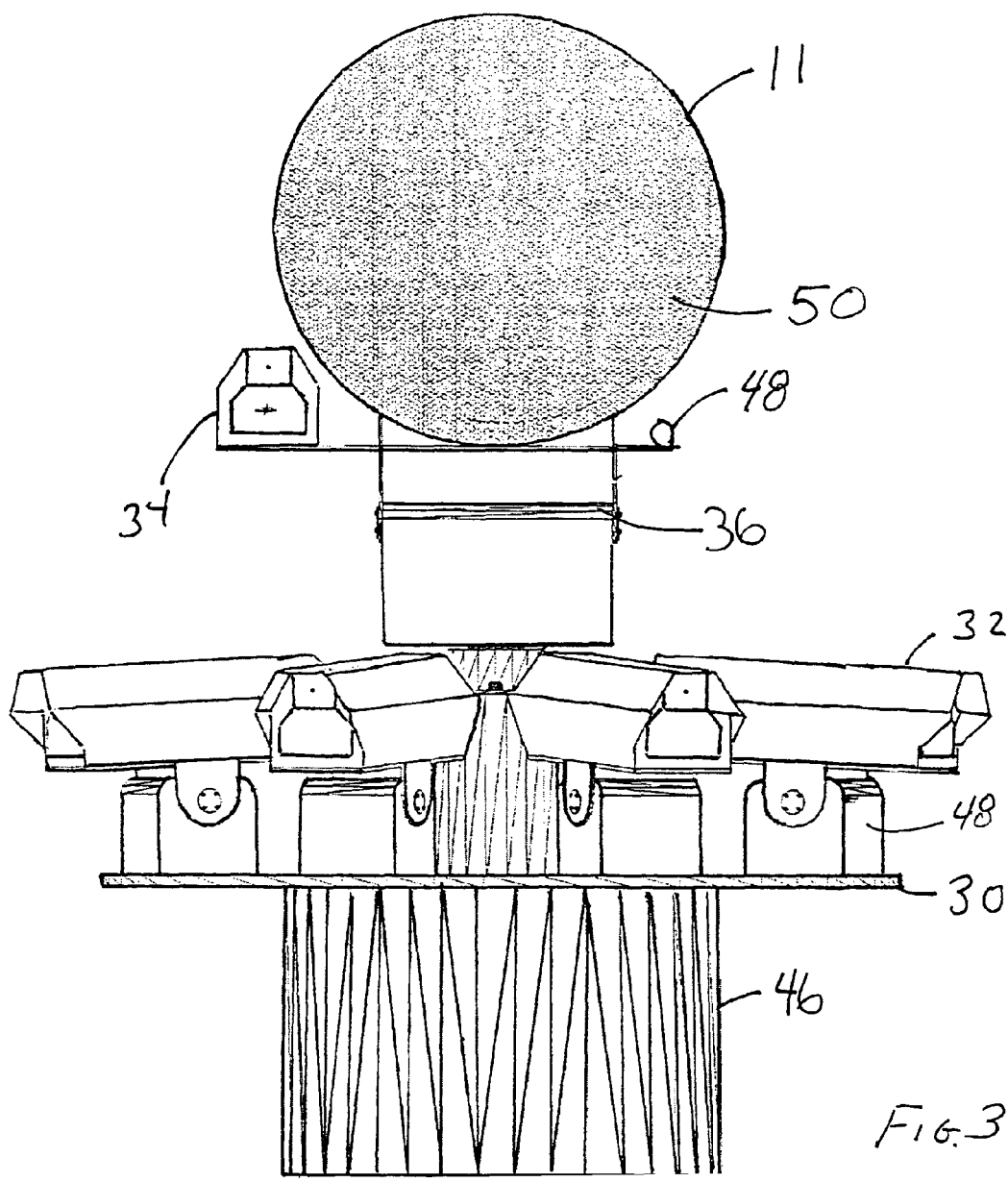

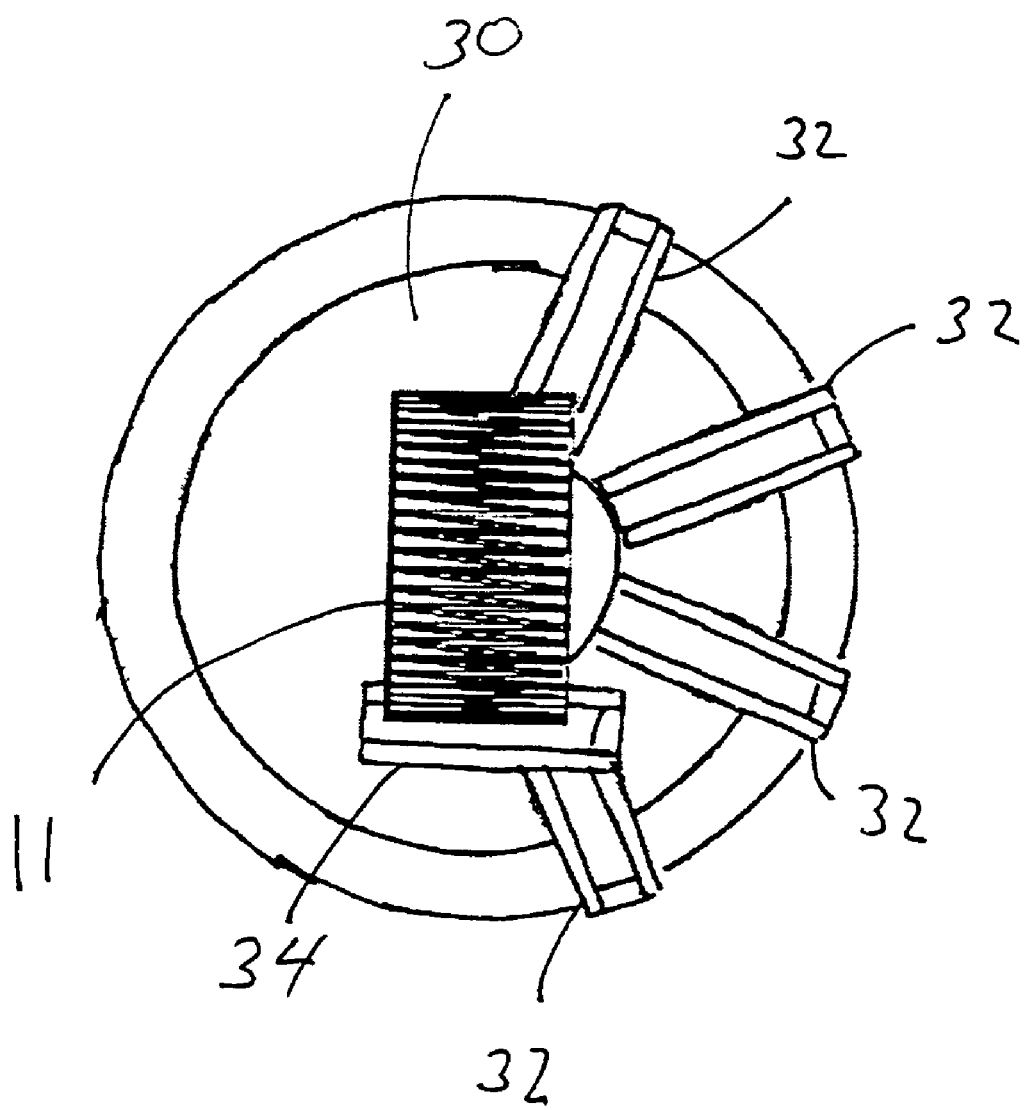

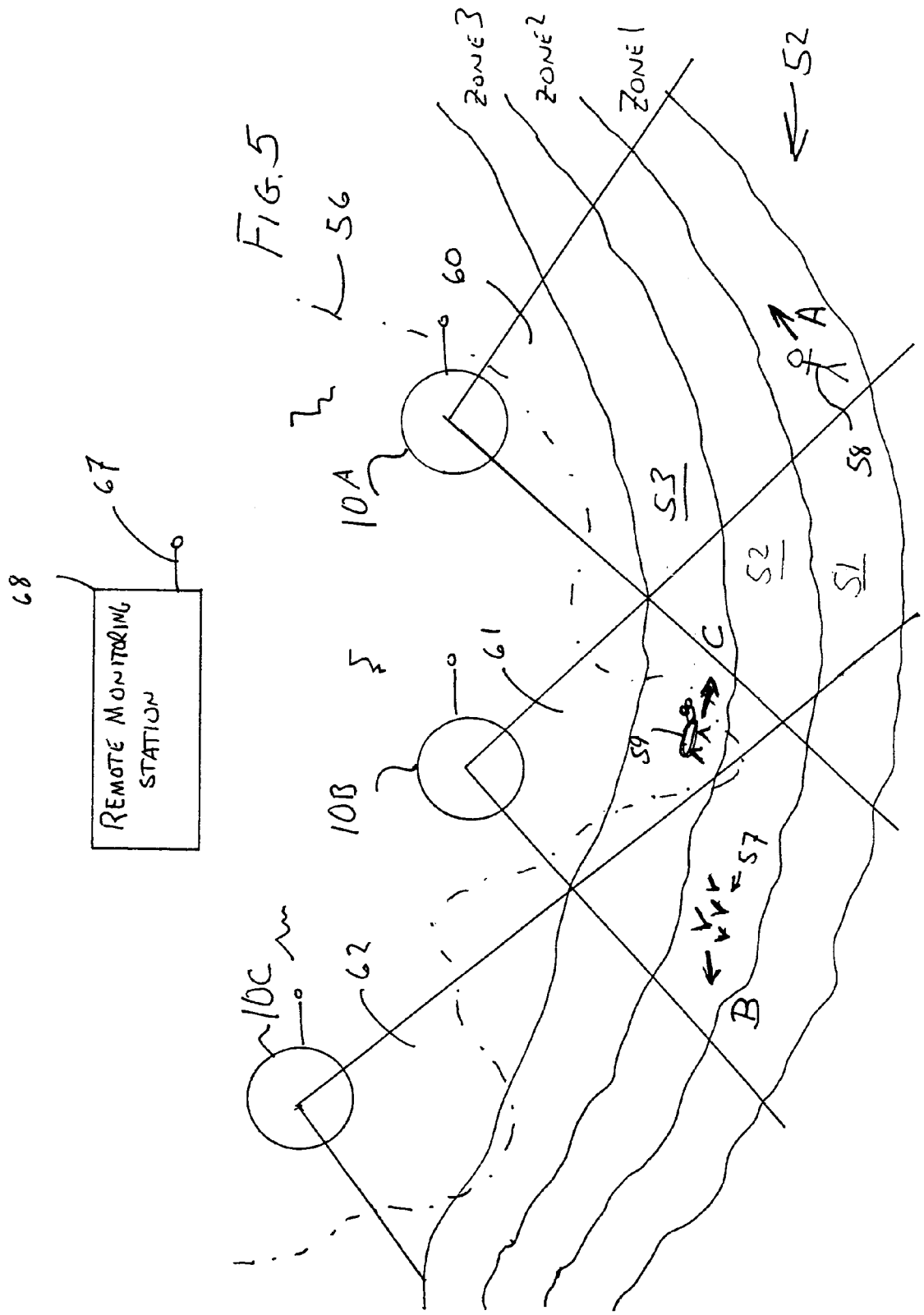

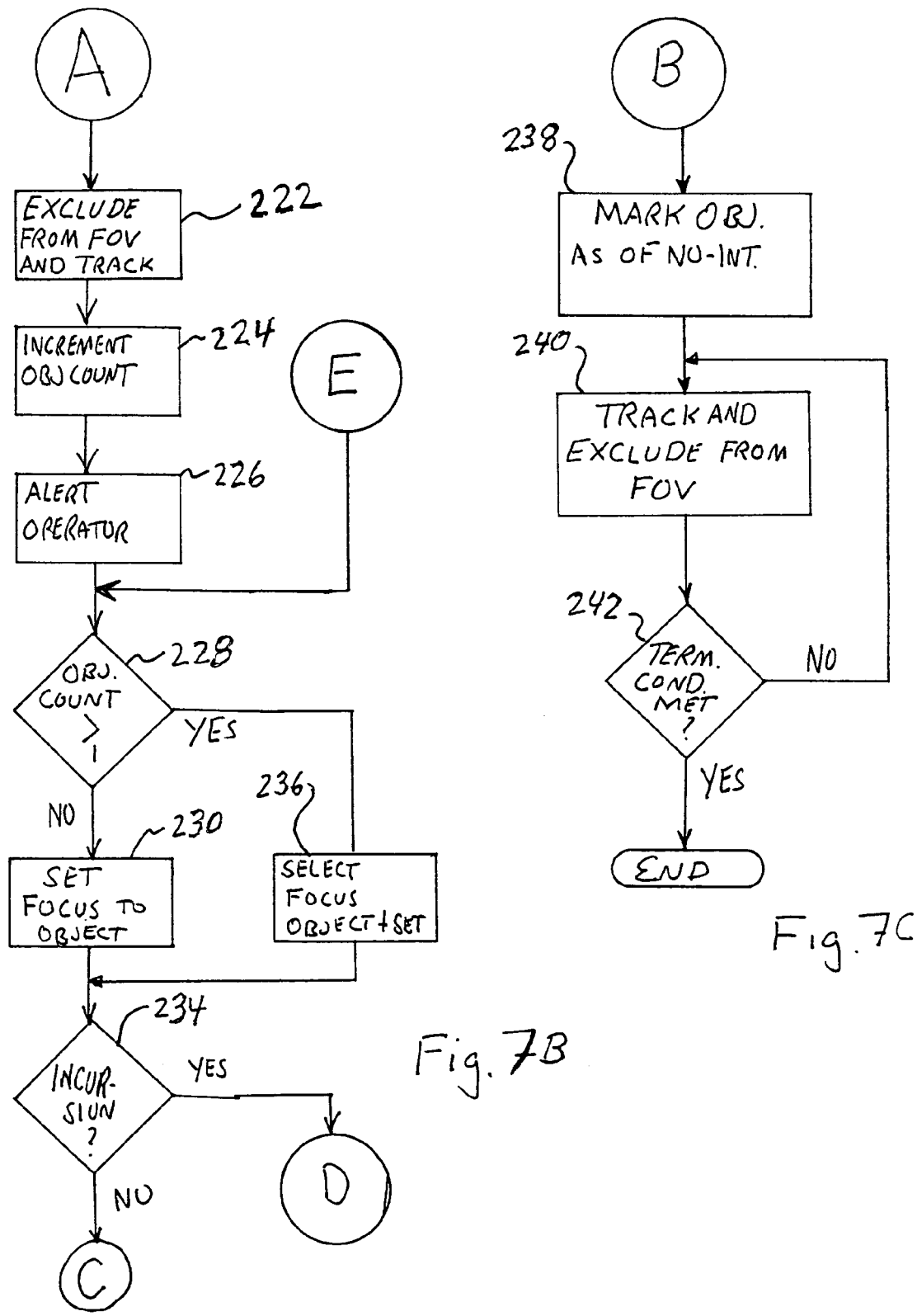

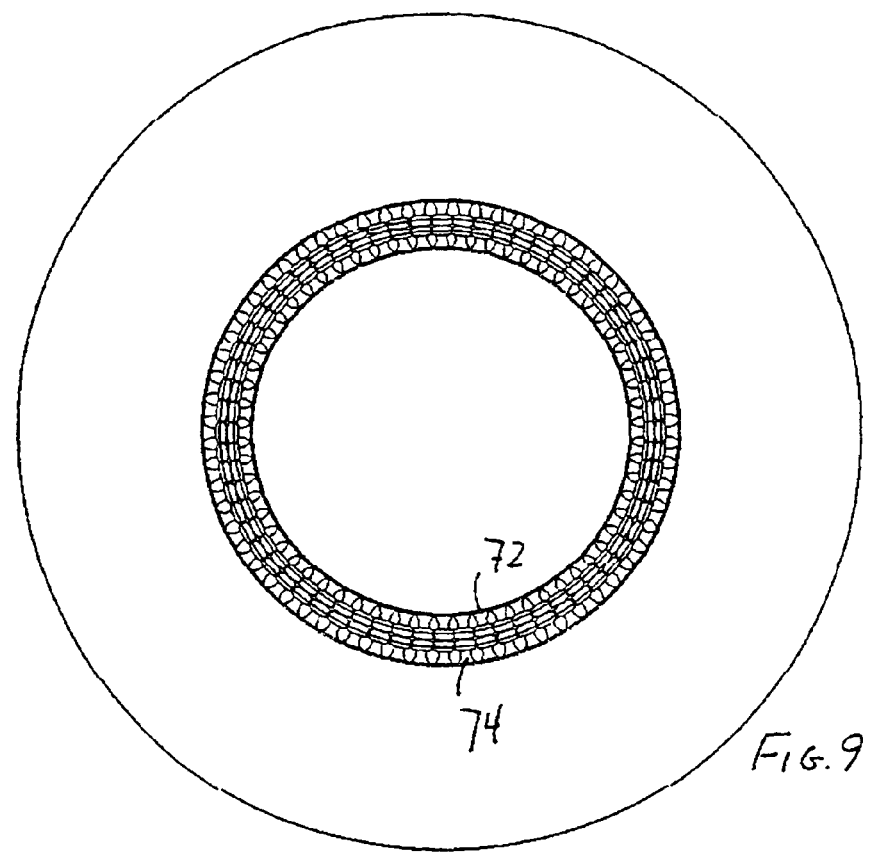
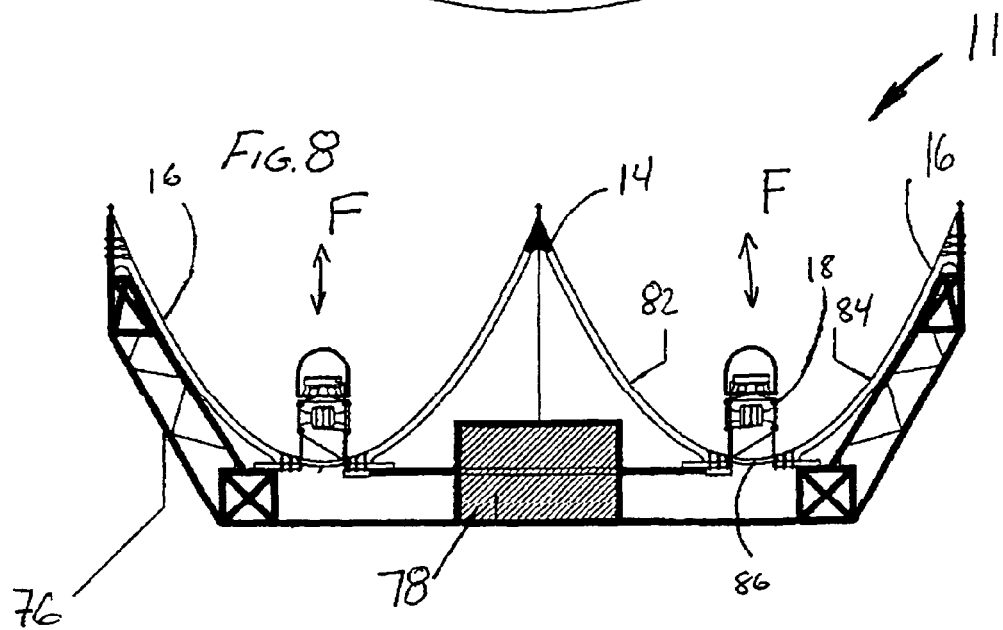

ROBOTIC SENTRY WITH LOW DISPERSION ACOUSTIC PROJECTOR

BACKGROUND OF THE INVENTION

1. Technical Field

The invention relates to wide area surveillance and is specifically directed to a robust, outdoor automated sentry equipped both for monitoring an area and for challenging unauthorized entry to the area under surveillance.

2. Description of the Problem

Unmanned, wide area video monitoring for perimeter or boundary control has become steadily more common in recent years as cameras and monitor components have declined in price. Data processing and network communication links are capable of handling large quantities of digitized, raw data. Video monitoring can work under both daylight conditions, using the usual visual bandwidth, and under low light conditions using the near infrared spectrum. Techniques for automated identification of regions of an image with a high likelihood of corresponding to an object have been developed. The various techniques of object recognition require associating groups of pixels together as the "object". Once an object has been identified, the object can be characterized by shape (including a dynamically changing shape as might be produced by a flock of birds), form and expected location. An identified object may be further characterized by trajectory and velocity information. Selected data was characterized in U.S. Pat. No. 6,947,590 as pixel metadata.

While monitoring of an area is well developed, most security systems have relied on directing a human to the locale of a detected intrusion. The lack of a non-lethal or non-crippling methods of repelling intruders has also hampered deployment of automatic or remotely controlled instrumentalities for discouraging encroachment.

SUMMARY OF THE INVENTION

The invention utilizes remotely locatable sentries or watchtowers/masts, supporting monitoring elements operable as part of a network of such sentries or towers for securing a border or perimeter over a wide area. The sentry or watch towers include video monitoring systems combined with non-lethal, sound-based instrumentalities for discouraging entry into and passage through a secured zone. Alternative non-lethal measures may include laser dazzlers or microwave devices. Sentries may be mobile or airborne. The towers are fixed positionally and serve as redoubts, intended to limit unauthorized tampering or disabling of surveillance and other equipment mounted on the tower. The tower also increases the field of coverage of the sensors by raising them well above the surrounding terrain. Local power is provided by conventional, buried power lines if available or by solar cells and batteries or a generator. A computer, located either locally or located remotely and accessed over a network data link provides for automatic data capture for archiving and analysis of the images collected by cameras located on the tower which cover a field of view around the tower. Objects passing into or through the field are located and characterized, preferably using algorithms now known in the field such as trajectory algorithms which match trajectory behavior with identification of the object. It is anticipated that the system will be calibrated for the detection of human infiltrators, but the system could readily be applied to animal control. An acoustic projector is installed on an altazimuth mount allowing it to be aimed under the control of the computer or an operator. Based on the tentative identification and the location of the object, an automated message may be broadcast over the projector targeted on the object. Under automatic operation or operator control the acoustic projector may be used to hit the object with discomforting sound beams or microwave radiation in order to discourage further penetration of the zone into the secured area. Communication between the tower and the operator is over a bidirectional communication link between the computer and the operator station. The acoustic projector may include acoustic sensors allowing use of the acoustic projector as a listening device both to aid in automatic identification of a target, to allow automatic or operator communication, and even to allow dialogue with the target. The ability to eavesdrop on conversations between people moving through the field of view may allow an operator to obtain information useful to effective dialogue.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a front elevation of a camera stand and low dispersion, sound collector/projector used to implement monitoring and control features of the invention and located at the top of the watchtower of FIG. 1.

FIG. 4 is a top plan view of the camera stand of FIG. 3.

FIG. 5 is a map illustrating fields of view for a series of watchtowers.

FIGS. 7A-E are high level flow charts illustrating a method of implementing the invention.

FIG. 8 is a cross-sectional view of a low dispersion, focusing sound collector and projector used with the invention.

FIG. 9 is a front elevation of the projector of FIG. 8.

DETAILED DESCRIPTION OF THE INVENTION

Figure 1:
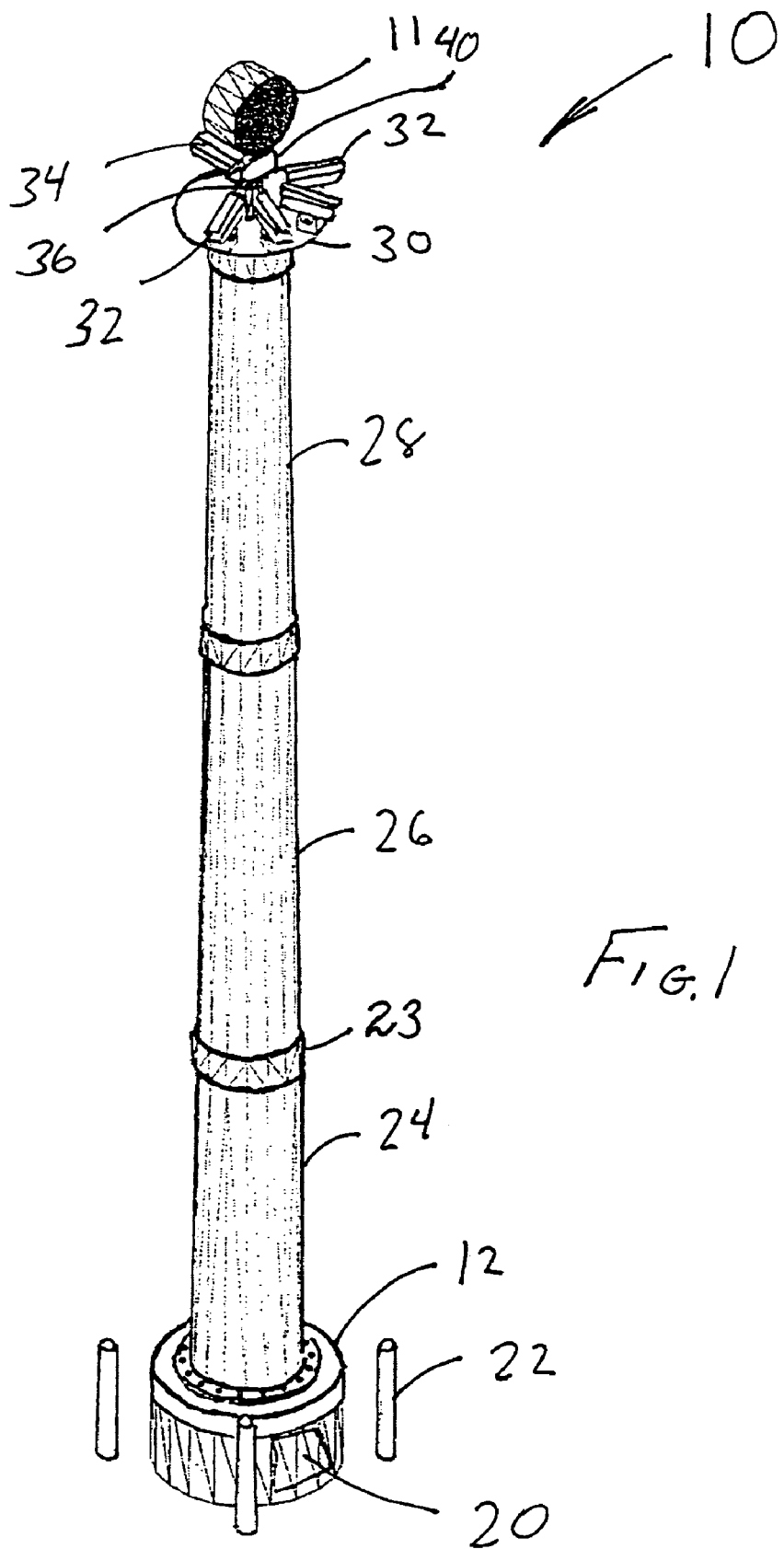
FIG. 1 is a perspective view of a watchtower for the invention.

Referring to FIG. 1 a watchtower 10 used to implement area monitoring and securing is shown. Watchtower 10 is anticipated to be one of plurality of towers disposed at approximately 1 kilometer intervals along a boundary or perimeter of a region to be secured. Watchtower 10 has three major sections, a reinforced base 12, a retractable mast 23 supported on and extending upwardly from the reinforced base 12, and a top 30 located at an elevated location on the retractable mast 23. Top 30 carries the local monitoring equipment, deterrent devices, wireless communication instrumentalities and data processing elements for a broad area security system.

Reinforced base 12 has an interior which is accessed through a port 20. Reinforced base 12 may be used to house a power supply such as batteries or a diesel generator. Reinforced base 12 may be further protected by placing bollards 22 around the reinforced base in a protective constellation.

The present invention provides deterrence features which are capable of automatic or manual operation. The deterrence instrumentalities are one or more energy projectors such as energy projector 11 installed on top 30. While in theory various types of "energy" may be projected, the preferred embodiment of the present invention utilizes acoustic energy, and the projector is an acoustic projector such as described in a copending United States Patent Application for an Acoustic Energy Projection System, appl. No. 11/454,914, filed 16 Jun. 2006 by the present inventor, Curt Graber. The '914 application is hereby incorporated by reference.

In order to function this system must provide for detection of intruders. Fixed cameras 32 and a movable targeting camera 34 are the principal tools used to implement monitoring.

Energy projector 11 and targeting camera 34 are supported on an altazimuth mount 36 which is in turn supported directly or indirectly from top 30. Directly supported by top 30 are a plurality of fixed cameras 32 arranged to provide coverage of an area adjacent or near to watchtower 10. Top 30 may also carry solar panels (not shown) if such are used as part of the power supply system, a spotlight (a detection aid, not shown), which would be added to the altazimuth mount 36, a laser dazzler (a deterrent, not shown), a focused microwave projector of millimeter wavelength (as a substitute or a supplement to the sound projector) and a housing 40 for local data processing and wireless communication equipment. Local data processing and wireless communication equipment may also be located in a mast cap 46 directly below top 30 or within the energy projector 11.

Figure 2A:
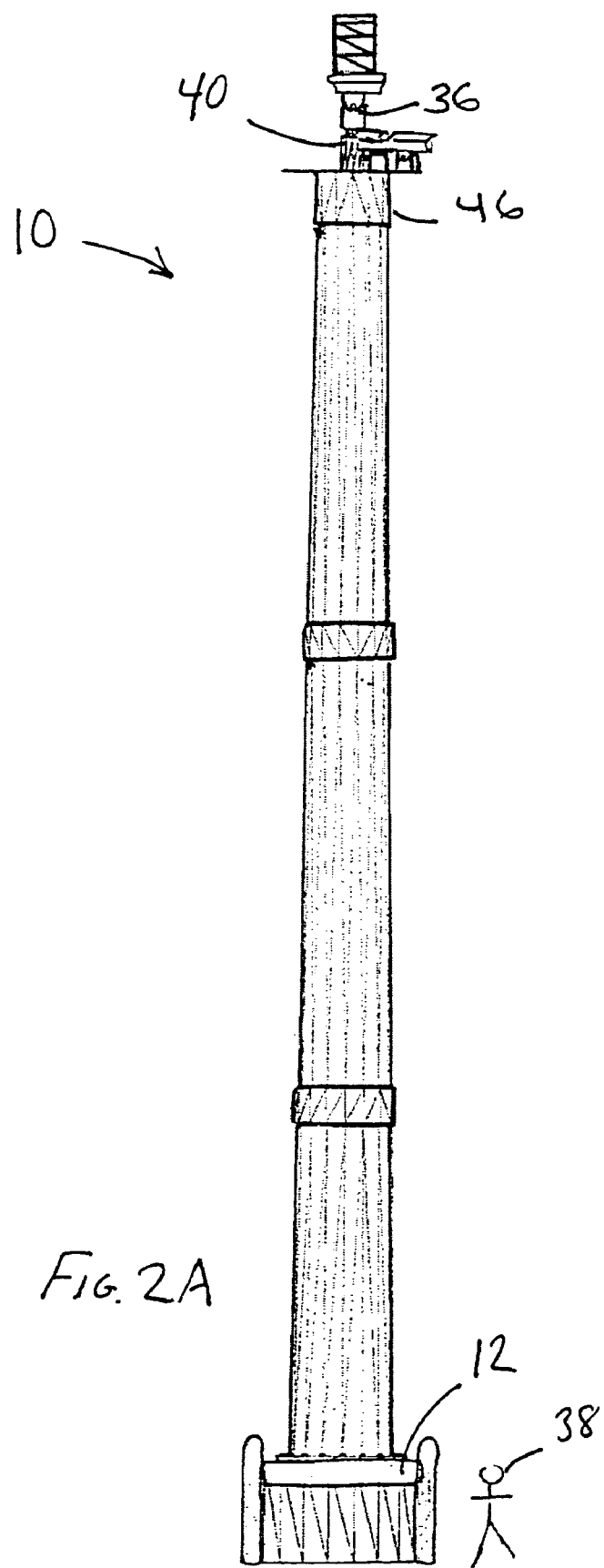
FIG. 2 is an elevation view of the watchtower of FIG. 1.
Figure 2B:
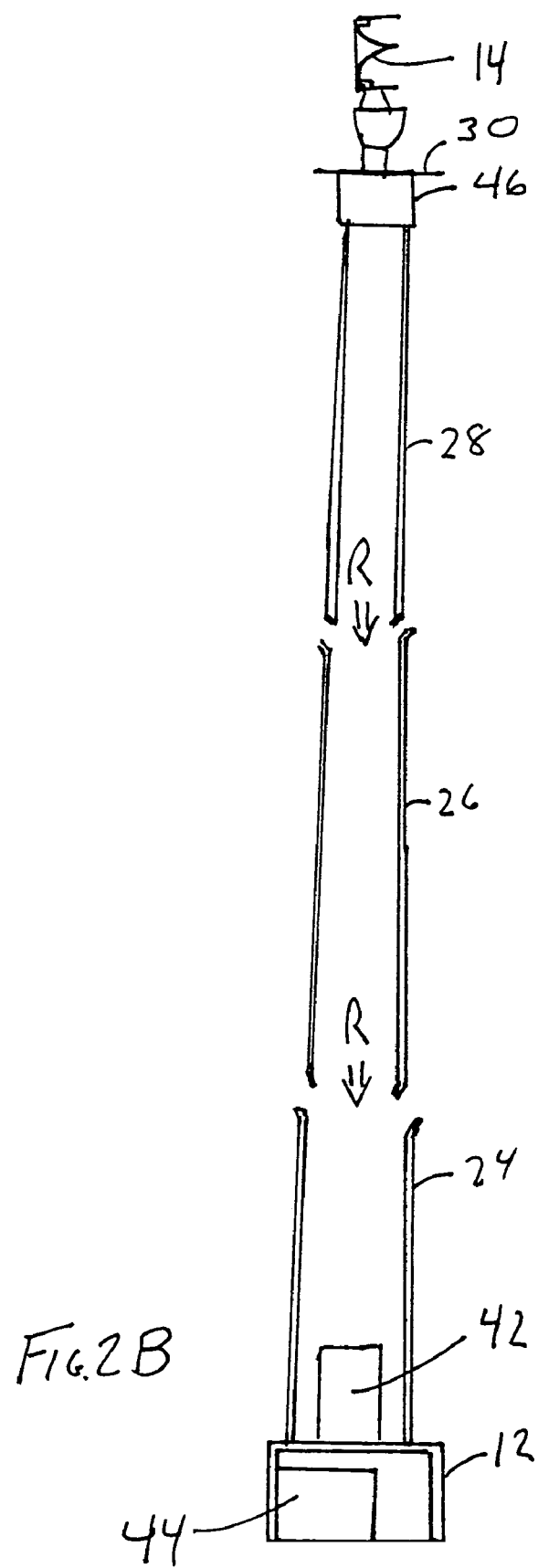

FIGS. 2A-B illustrate possible locations for equipment used with watchtower 10. A power supply 44, such as batteries or a diesel engine, are located protected in reinforced base 12. Upper and middle mast sections 28, 26 nest in base mast section 24 as indicated by arrow "R". A mast retraction and raising system 42 is located within mast base section 24. Energy projector 11 is preferably an acoustic energy projector base on a cone reflector 14. Representation 38 of an individual illustrates the relative size of an average person against the size of the watchtower 10.

FIGS. 3 and 4 provide more detailed views of the top 30, and the arrangement of equipment on the top. A laser dazzler 48 or spotlight can be positioned on an altazimuth mount 36 as shown. A microwave projector could be located centered in an LDAP projector, substituting for the inner cone 14. Fixed cameras 32 are installed on mounts 48 which allow for adjustment on installation to take into account terrain of the area to be covered. Generally four fixed cameras 32 are used to provide a field of view (FOV) with an approximately 180 degree arc around the watchtower. Projector 11 is covered by a screen 50 which obscures the internal arrangement of the projector and thereby renders more difficult any action to render the projector inoperable.

FIG. 5 illustrates border and perimeter control using a network of three watchtowers 10A-C. Watchtowers 10A-C have a wireless connection 67 to a monitoring station 68, which may be remotely located and which is preferably manned. Watchtowers 10A-C have fields of view 60, 61, 62, which are illustrated as overlapping, though it is not required that this be so to provide surveillance over an area 52 intrusion into which by a person 58 is supposed to be detected. Area 52 is divided into zones 51, 52, 53, although, depending upon the application, the number of zones could be increased or decreased. Zone 51 may be termed a warning zone. A person 58 moving through this zone along trajectory A might be periodically warned that they were approaching areas to which entry was forbidden them. Typically no direct action would be taken to exclude the person beyond periodic repetitions of the warning so long as the person did not cross into the next area. Warning frequency might be made dependent upon the degree of penetration into zone 51. A flock 57 of birds is shown moving through zone 52 on trajectory B. Data processing equipment could be programmed to recognize flocks as objects not of interest, which would result in no action being taken. A person in the same area would receive heightened warnings in this zone and ordered to retreat. Zone 53 may be termed an exclusion zone. Selected objects moving through this area would be subject to exclusion. A four legged animal 59 is shown in the area. If the system were applied to wildlife control around a major park it could be used to monitor movement of a predator, such as a wolf, leaving the park in the direction of agricultural areas, in which case the system could respond with non-lethal deterrent actions as described below. A contour line 56 is illustrated winding its way in and out of area 52. The system can use trajectory analysis as a way of identifying objects and as a way of characterizing objects as being of interest. The physical terrain covered by a given watchtower can, particularly if rugged, affect the trajectory of objects (e.g., relative bearing, acceleration, velocity) moving through the fixed cameras' field of view. Knowledge of local contour may control the selection of the trajectories of interest for watchtower 10C but not 10A, but it is not necessary that the trajectories of interest be determined be preprogrammed. They may be identified by operators based on experience.

Figure 6:
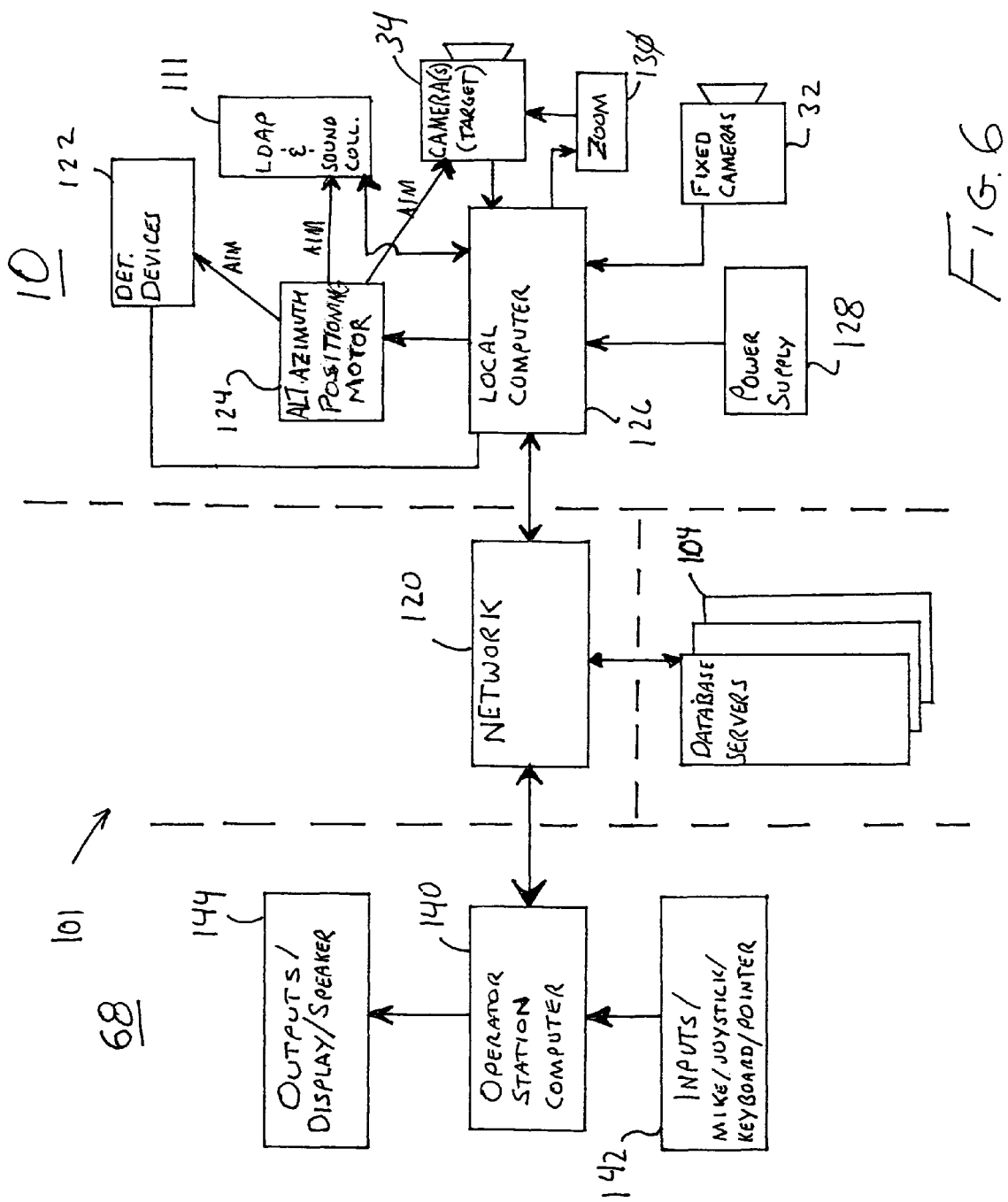
FIG. 6 is a block diagram of the system of the invention.

Hardware support for the present invention can be configured in a variety of ways. FIG. 6 is a high level block diagram of an illustrative arrangement of a system 101 providing for such hardware support. A watchtower 10 may be equipped with a local computer 126 which receives power from a local, or secure commercial, power source 128. Local computer 126 generates control signals for altazimuth positioning motors 124 which allow deterrent devices 122, the low dispersion acoustic projector and sound collector (LDAP) 111 and the targeting camera 34 to be aimed. Control outputs to the deterrent devices and loudspeakers used for acoustic energy projection are applied by the local computer to deterrent devices 122 and LDAP 111. Sound collected by LDAP 111 microphones is in turn applied to local computer 126 as is the video signal generated by targeting camera 34. The targeting camera 34 has a telescopic zoom 130 under the automatic control of local computer 126. The remote operator may direct responses of the local computer 126 to the extent permitted by programming. Fixed cameras 32 also provide video signals to local computer 126. The video data may be archived locally or on a database server. As will be understood by those skilled in the art all signals are subject to digital signal processing before application to the local computer 126.

It is anticipated that one human operator will be assigned groups of adjacent watchtowers 10. Such operators can be located remotely at an operator station 68 equipped with an operator station computer 140 and appropriate input and output devices 142, 144 allowing the operator to monitor anything picked up by the cameras and sound collecting system of a watchtower or sentry and to exercise control over the deterrent devices 122 such as the LDAP 111 acoustic energy projector. Inputs 142 will naturally include a pointing device and a keyboard, but will preferably include a microphone for generating audio messages to be transmitted by the LDAP 111 and may also include a joystick for aiming the systems supported on the altazimuth mount and for control of the zoom 130 feature.

System 101 provides a network to connect the local computers 126 of a group of watchtowers 10 to the operator station 68. Network 120 is illustrated as providing access to database servers 104, which may be located at the operator station 68, or dispersed among various agencies of the institution charged with control of the system. Database servers 104 may include object identification characteristics supporting the automatic determination by particular watchtowers 10 that an object entering the field of view (FOV) of fixed cameras 32 is an object of interest. Database servers 104 may provide facial and voice recognition systems allowing instant identification of known individuals entering an area. Other databases 104 might include one of criminal records, etc., as well as object qualification criteria.

Referring now to FIGS. 7A-E, implementation of the system is exemplified by relation of the functions carried out by system 101 to a flow chart. System 101, and more particularly a given watchtower 10 within system 101, normally operates in an automatic mode until detection of an event which triggers an alarm for an operator. Essentially fixed cameras generate of an image for a field of view which is scanned for motion of objects within the FOV (step 202). As long as object motion is not detected (step 204, the NO branch) the routine cycles through the object and motion detection operations without spawning of a sub-process. Once motion of an object is detected (illustrated as the YES branch from step 204), a sub-process is spawned and the object tagged (step 206). The detection of "object motion" may appear to assume that an object is identified before its motion can be detected, however, motion of an object may be inferred from value changes of a group of localized pixels before "object" identification has occurred. Thus step 204 can be taken as simultaneous qualification of changing pixel values used for both object and motion detection.

It is intended that system 101 provide a tentative identification of objects, first by associating groups of pixels in the image with one another as an object based on pixel data and metadata than characterization of the object by shape, size, form, and trajectory. Steps 208, 210 and 212 refer to characterization and identification of the object. Information accumulated about an object includes its shape, form, size (from range) and its trajectory. All of these object characteristics may be compared to a library of objects previously determined to be of possible interest. Because terrain effects can alter measurable characteristics of images of physically like objects, such as typical trajectories, databases of objects may be limited to a locale, even if stored on a remote server. The characteristics should be defined as ranges to avoid generation of an overly large database.

Development of the object database for a locale is expected to be heuristic. That is, there will initially be few objects in the database, and objects will be qualified based on operator input. Accordingly, step 214 provides for comparison to the library of an object for which data and metadata has been generated. If no match is generated step 216 is executed to alert an operator and the object is made the current focus of the local watchtower(s) which have it "in sight", that is the targeting camera 34 is used to track the unidentified object. At step 218 the object is identified as being either "of interest" or "not of interest". Next, at step 220 the routine branches between objects of interest and those not of interest. Objects that were identified at step 214 are also handled at step 220. Objects of interest follow A to FIG. 7B. Other objects result in the subprocess following B to FIG. 7C.

Objects, once identified, can be considered as logically separate from the field of view as indicated at step 222. It is possible that more than one object of interest is moving through the field of view, so a count is kept of the number of objects at step 224. One reason for this is that, as the system is presently configured, only one targeting camera 34 is provided per tower, though it would be possible to provide more than one. At step 226 an operator is notified of the detection of an object of interest, as well as the location. If the object count is greater than one, and only one targeting camera is available it is necessary to set (and repeatedly reset) one object as the current focus which the targeting camera will track. Thus at step 228, if the count is not greater than one, the focus is set to the only current object of interest in the field of view (step 230). If the object of interest count is greater than one a focus object must be selected following the YES branch from step 228. At step 236 a subroutine to select the focus is called, and, after a focus has been returned, or set at step 230, the process moves on to step 234 to determine if a focus object has made an incursion into a surveillance or exclusion area. If No incursion is detected path "C" is followed from step 234. If an incursion has been detected the YES branch is followed from step 234 to step "D".

Turning to FIG. 7C, processing of a object which is not of interest (step 238) is considered. Such an object is excluded from the field of view at step 240 until the conditions for terminating the subprocess, such as prolonged non-movement, or long repeated cyclic movement (such as a tree blowing in the wind), cause a time out at step 242.

Figure 7A:
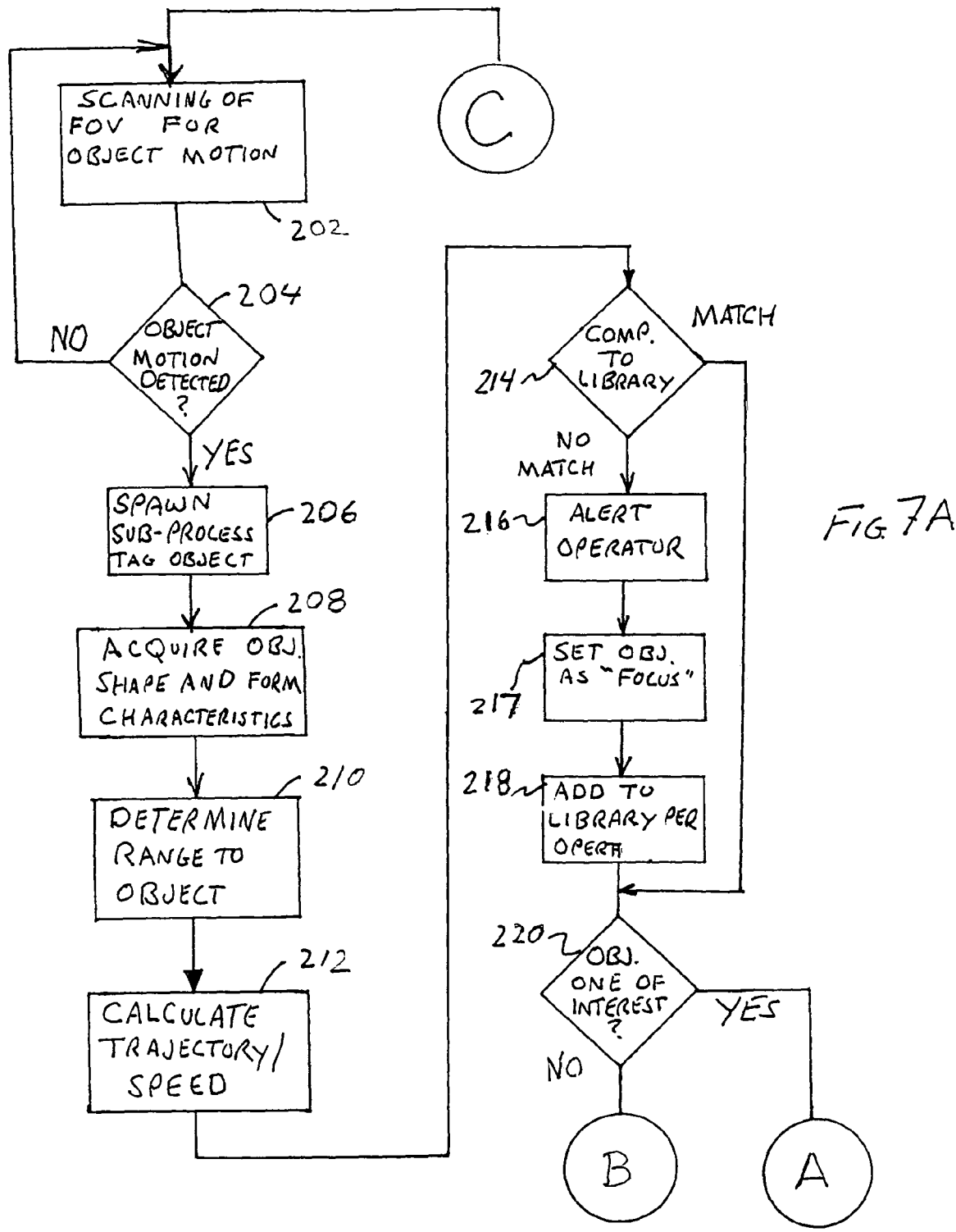
Figure 7D:
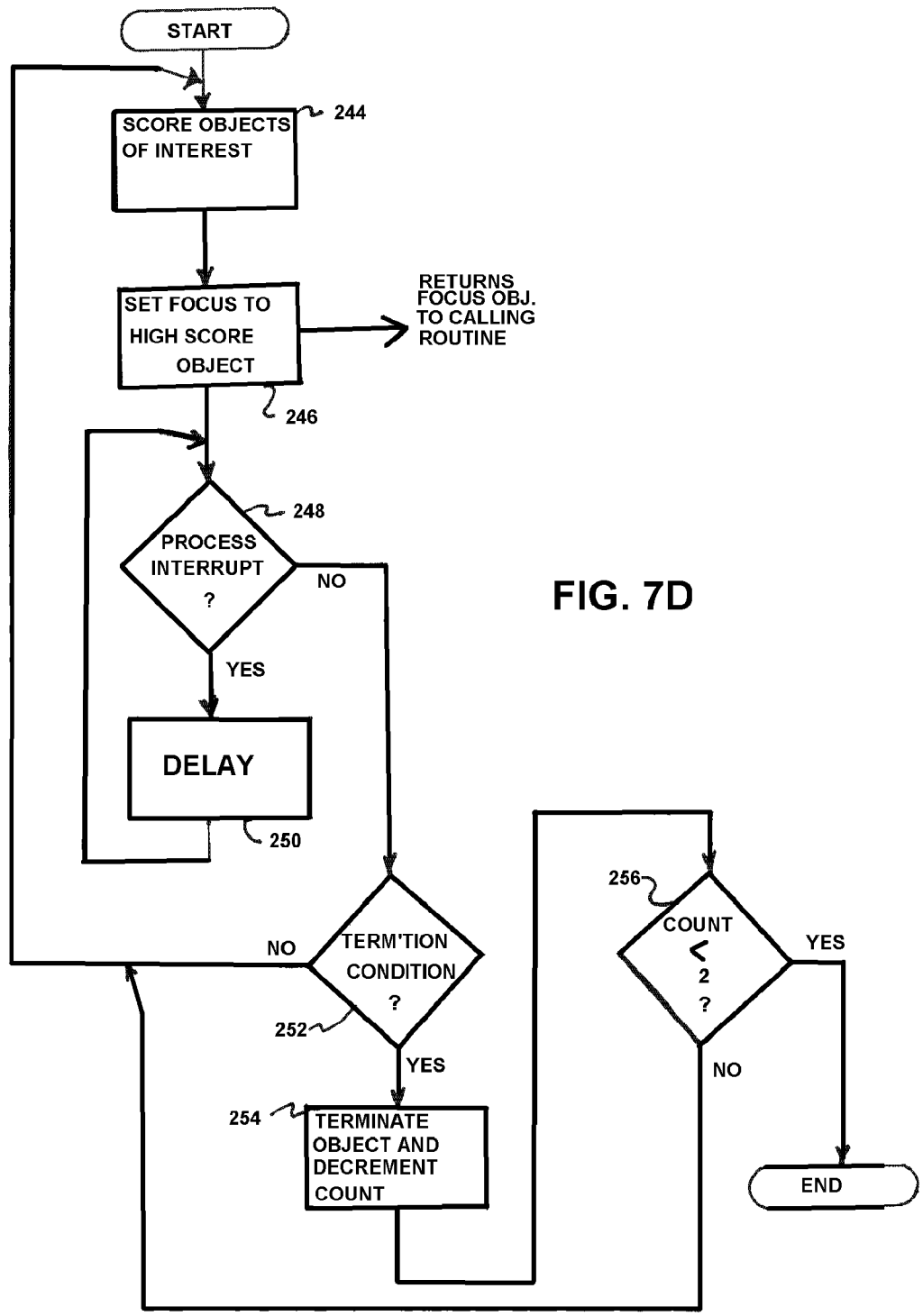

The process of FIG. 7D represents the process called at step 236 to determine a focus from a plurality of objects of interest. At step 244 the individual objects are scored by selected criteria, such as proximity to the area under control, or, if trajectory considerations are used, estimated time until the object will clear the zone under surveillance in the direction of an area which the object is to excluded from. The focus is set to the highest scoring object, which is returned to the calling process. The process of FIG. 7D continues as a background process. Following step 246 step 248 is executed to determine if the process has been interrupted by operator action. If yes a delay loop (step 250) is entered along the NO branch from step 248. If not the NO branch is followed to step 252 to execute the object termination conditions. If all objects remain viable the NO branch is followed from step 252 to step 244 and to rescore of the objects of interest. If an object has met the termination conditions, the YES branch is followed to step 254 to terminate the object and decrement the count of objects. At step 256 it is determined if a plurality of objects of interest remain in the field of view, and if so, the process loops back to rescore the surviving objects. If the count is less than two the subprocess is terminated until recalled.

Figure 7E:
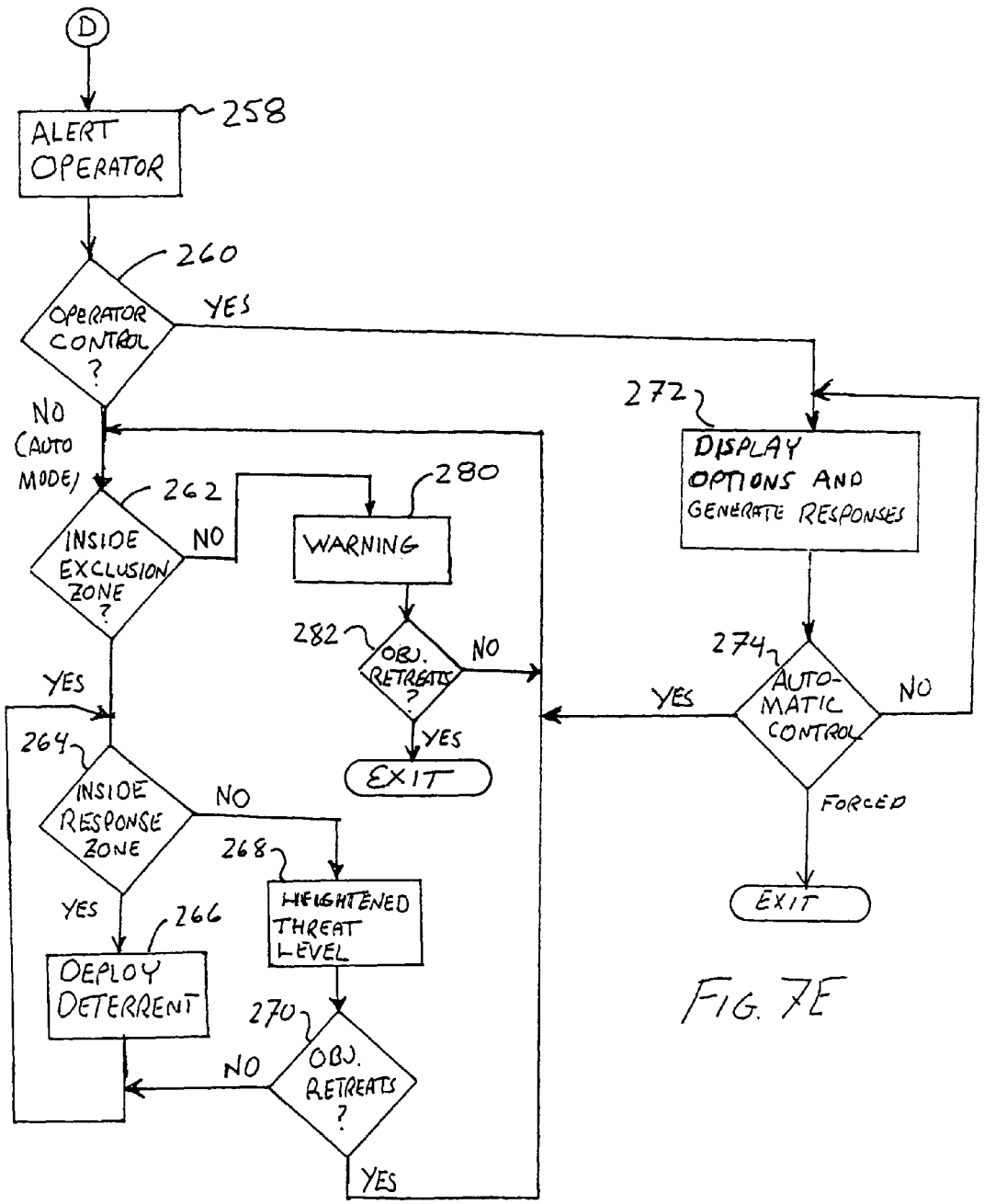

FIG. 7E reflects the handling of movement of objects of interest into and through the various zones of FIG. 6. These steps follow after detection of an incursion in step 234. At step 258 the remote operator is alerted. The operator may intervene at any time (indeed no alert is required), however, operator assumption of control is reflected by a decision box at step 260. The NO branch from step 260 reflects the operator leaving the system on automatic mode. The process of the FIG. 7E is entered only after an incursion into at least zone 1 (or the least restrictive zone). Therefore it is only necessary to determine if the object has progressed into zones 2 or 3, or retreated.

At step 262 the range to the object is taken. This may be accomplished in a number of ways, for example, if an object is in an area of two intersecting fields to view relative bearings from two towers may be taken to obtain a range by triangulation. More typically a laser range finder, a radar system or an echo location system mounted on the altazimuth mount is employed. Range markers may even be placed in the field of view. Once a range is taken it can be determined if the object of interest is inside the exclusion zone or not. If not, the NO branch is taken and a warning issued at step 280. After a delay another range to the object of interest is taken to determine if the object has retreated outside of the warning zone (step 282). If Yes the process can be exited. If No, the process returns to step 262 to determine if the exclusion zone has been entered. Once the exclusion threshold is crossed and the YES branch followed from step 262 it is determined if the object has crossed into the response zone. If NOT, the NO branch is followed from step 264 to step 268 and the threat level is raised to reflect the increased threat level represented by the object. Automatic responses at this point may include the projection of uncomfortable sound or microwave radiation toward the target or use of a laser dazzler. Following use of the deterrent appropriate to the level of incursion, it is determined if the object has retreated at step 270. If YES, the process returns to step 262 to determine if the object continues to retreat. If the object does not retreat the process loops back to step 264 to determine if penetration of the area progresses. If YES, step 266 follows step 264 because the object has moved into a response zone and the highest level deterrent is deployed.

Returning now to the circumstance where an operator assumes control along the YES branch from step 260. Step 272 simply notes that options are displayed to the operator and responses taken as the operator instructs. Step 274 following step 272 reflects return to automatic control, either by the operator forcing the system not to follow a target or back into the automatic response mode.

Referring to FIGS. 8 and 9 an acoustic radiator and collector incorporates a reflector with an inner cone surface and an outer annular reflecting surface suitable for use in the system of the present invention. The particular configuration is by way of example only, and it is not the only such system which could be used. However, the use of an inner cone reflector is favored because, conventionally, sound focusing system are based on a simple concave dish with the transducer element mounted centered in the dish. Such systems are more vulnerable to damage by gunfire than the present system. The cone reflecting system allows more acoustic energy to be input into the system. The inner reflecting surface 82 is provided by the cone reflector 14, which is preserved from the first embodiment of the invention. A second, outer reflecting surface 84 is provided by a forward concave annular ring 16. Outer reflecting surface 84 is preferably parabolic in its sections, but differs from a conventional parabolic dish in that the bases of the parabolic sections to not meet at a single point in the base of the dish, but instead surround an annular gap in which cone reflector 14 may be placed. Outer reflective curve 84 can be fitted to curves other than parabolic curves. A radial speaker/microphone housing 18 is located centered under the inner cone 14. The housing 18 may be moved in and out (double headed arrow F) parallel to the radiating axis of the system to change the range to its focal point forward from the dish. Outer ring 74 is an array of microphones for collecting sound. Where the system is used for controlling the movement of people across a border it is believed that it could be used to eavesdrop on people at great distances, and an operator could then listen to any conversation, possibly to the extent of learning the identity of the people, or at least the names they are using among themselves. The operator could then use the system literally to talk to the individuals on a first name basis. If only an inner cone is used, microphones may be interspersed with the transducers. Housing 78 tucked under the cone 14 is used to house system electronics.

A radiator/collector used in the present system may take many forms, but that illustrated here has several advantages. Where more than one reflecting surface is used the radiant axes of the surfaces are coincident.

Figure 10:
FIG. 10 is a menu of operator options for manual control of a watchtower.

FIG. 10 reflects a menu of options which may selected from by an operator. As mentioned already the system can allow the operator to eavesdrop (listen) or speak. He/she can select identity checks, including criminal records if available. The deterrent systems available can be displayed. Any other options available may be shown. For example, a system including GPS on response vehicles may be able to display response times. Search lights may be made available, etc. As will now be apparent to those skilled in the art, video cameras may be provided in infrared as well as visible light. The system may be automatically programmed to direct a variety of irritating sounds or microwave radiation toward an intruder.

Figure 11:
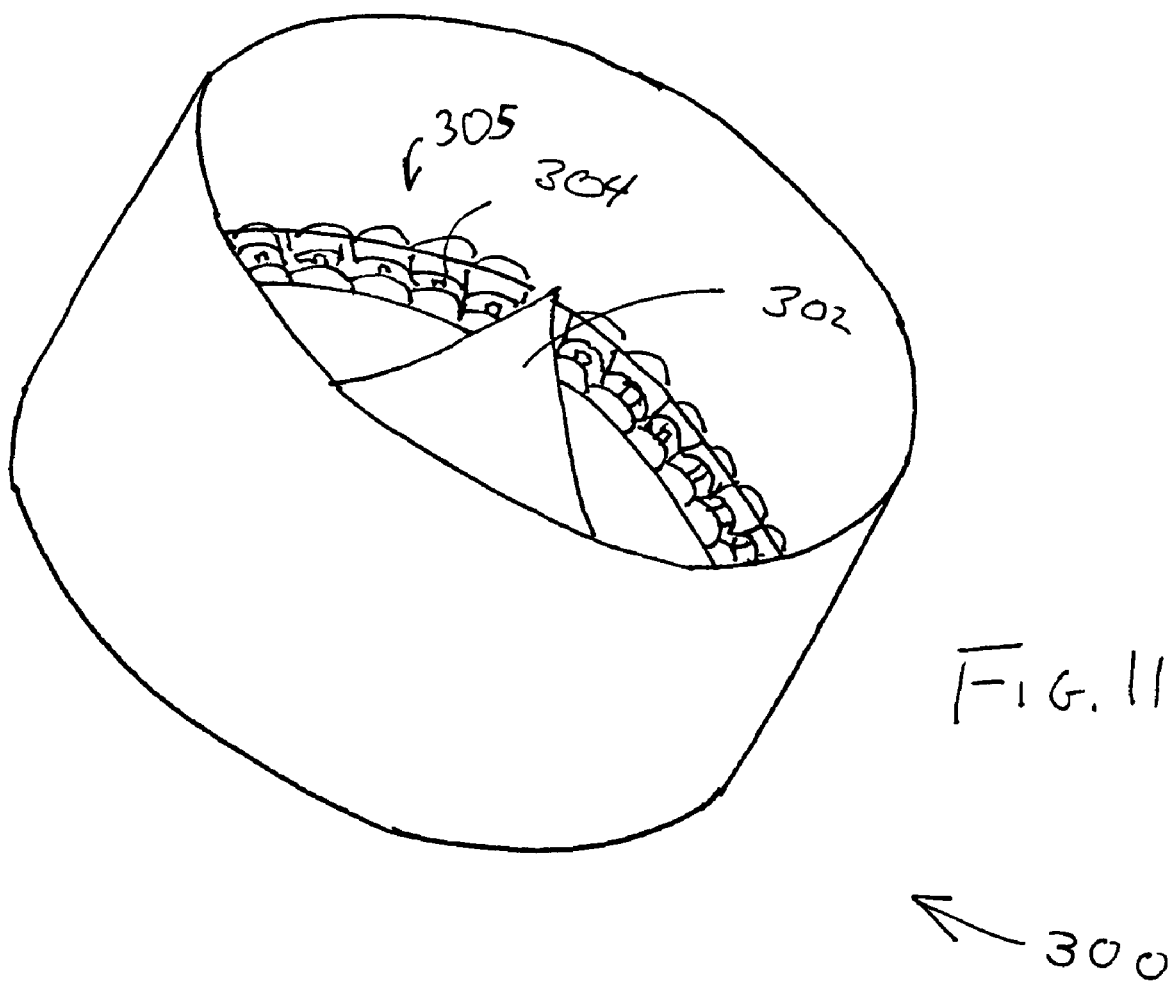
FIG. 11 is a perspective view of a microwave radiator dish suitable for installation on a top or on a mobile platform used in carrying monitoring elements of the invention.

Microwave projectors have been proposed which operate in a frequency range where the microwave radiation causes a burning sensation to an animal exposed thereto without actual tissue damage. A microwave projector 300 may be built based on similar collecting principals proposed for the acoustic projectors which the preferred energy projection device used here. An example of such a system in shown in FIG. 11, where a microwave projector 300 is constructed based on a ring 305 of microwave generators 304, oriented inwardly to direct energy against a central spike 302 for common reflection forward from the spike along a projection axis.

Figures 12, 13:
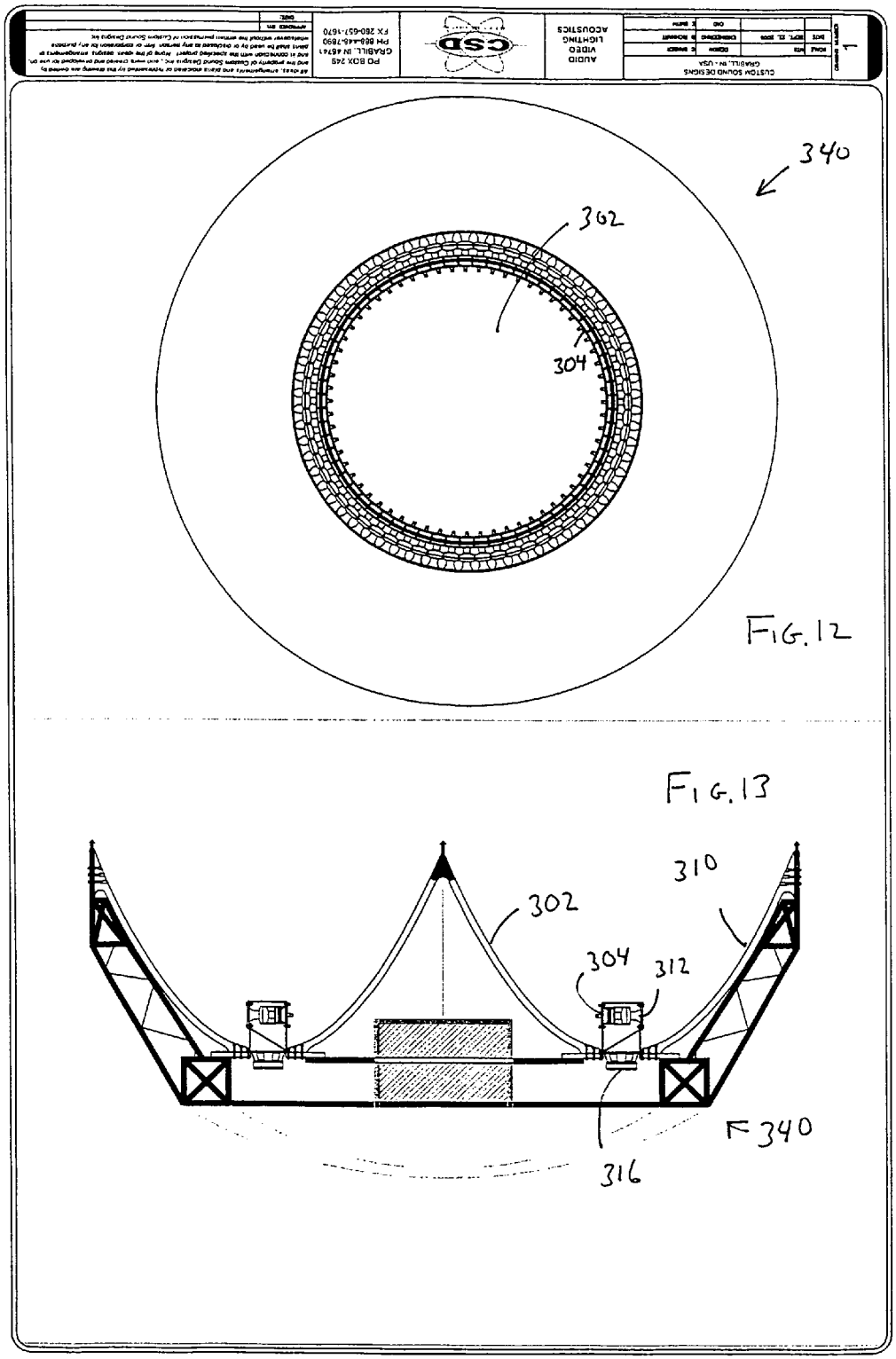
FIG. 12 is a front plan view of a combination microwave radiator and acoustic energy radiator.
FIG. 13 is a cross sectional view of a combination microwave radiator and acoustic energy radiator of FIG. 12.

Referring to FIGS. 12 and 13, a microwave projector 300 may be combined with an acoustic projector as a mixed energy type projector 340. The ring of microwave generators 304 are located in an inwardly oriented ring backed up against a plurality of outwardly oriented acoustic projectors 312 which direct sound energy into a conic section ring 310 for projection on the same axis as the microwave energy. Base units 316 are placed under the rings of microwave generators 304 and acoustic projectors 312.

The present invention provides a readily deployable surveillance and intrusion deterrence system. While operable in an automatic mode, it allows human intervention to tailor its response to fit the situation on the ground.

While the invention is shown in only a few of its forms, it is not thus limited but is susceptible to various changes and modifications without departing from the spirit and scope of the invention.

What is claimed is:
1. A sentry system comprising:
a remote operator station;
a plurality of watchtowers and communication channels connecting the plurality of watchtowers to the remote operator station;
a plurality of fixed cameras including at least one fixed camera located on each of the plurality of watchtowers to cover a local field of view in areas proximate to each of the plurality of watchtowers and to capture successive video images of the local field of view;
a local data processor for the fixed cameras or cameras for each of the plurality of watchtowers including a video signal processor for processing the successive video images to detect objects within its local field of view;
means for qualifying detected objects for tracking from the successive video images;

the means for qualifying detected objects including a visual recognition data base of characteristic ranges for size, shape and trajectory through the field of view for detected objects;

a steerable targeting camera on each watchtower which may be aimed by the local data processor to track a qualified detected object;

a steerable energy projector located on the watchtower which may be aimed by the local data processor to direct an energy beam toward the qualified detected object;

the communication channels including a bidirectional communication link between the local data processor and the remote operator station allowing an operator located at the remote operator station to direct aiming of an acoustic projector and to apply acoustic signals to the acoustic projector; and the means for qualifying further including means responsive to operator input for accessing the visual recognition data base for a watchtower allowing operator specification of characteristics of detected objects which mark them for initial automatic tracking.

2. A sentry system as claimed in claim 1, further comprising:

means for allowing remote operator station characterization of trajectory paths for an object located within the local field of views as a criterion for qualification of objects; and manual overrides to the local data processor allowing control in aiming of the steerable energy projector and to provide directly audio messages for transmission by the acoustic projector from the remote operator station.

3. A sentry system as claimed in claim 1, further comprising:

the remote operator station further including inputs allowing the operator to suspend local control over direction of the acoustic projector and to assume such control.

4. A sentry system as claimed in claim 1, further comprising:

a source of audio messages accessible to the local data processor;

the steerable energy projector including the acoustic energy projector; and the local data processor being coupled to transmit selected intelligible messages over the acoustic projector.

5. A sentry system as claimed in claim 4, further comprising:

a microwave energy projector as part of the steerable energy projector.

6. A sentry system as claimed in claim 4, the acoustic projector being further adapted for emission of a deterrent level tone.

7. A sentry system as claimed in claim 6, further comprising:

an acoustic source selectively connectable to the acoustic projector by the local data processor for applying intense acoustic signals to the acoustic projector.

8. A sentry system as claimed in claim 7, further comprising:

the acoustic projector including microphones allowing audio monitoring of targets identified by the video processor.

9. A sentry system as claimed in claim 7, further comprising:

the plurality of fixed cameras covering infrared and visible light spectrums.

10. A sentry system as claimed in claim 7, further comprising:

the local data processor further including programming for identifying geographical location from the video images.

* * * * *